United States Patent [19]
Watson

[11] Patent Number: 5,486,345
[45] Date of Patent: Jan. 23, 1996

[54] TREATMENT OF GASES

[75] Inventor: Richard W. Watson, Ilkley, United Kingdom

[73] Assignee: The BOC Group plc, Windlesham Surrey, England

[21] Appl. No.: 293,410

[22] Filed: Aug. 19, 1994

Related U.S. Application Data

[63] Continuation of Ser. No. 834,927, Feb. 12, 1992, abandoned.

[30]  Foreign Application Priority Data

Feb. 19, 1991 [GB] United Kingdom ............... 9103382

[51] Int. Cl.[6] .......................... B01D 53/50; B01D 53/52
[52] U.S. Cl. ................... 423/573.1; 423/574.1; 423/576.8; 423/222; 423/224; 423/242.1; 423/244.01
[58] Field of Search ................... 423/222, 224, 423/242.1, 244.01, 573.1, 574.1, 574.2, 576.8

[56]  References Cited

U.S. PATENT DOCUMENTS

| | | | |
|---|---|---|---|
| 4,798,716 | 1/1989 | Palm | 423/574 R |
| 4,844,881 | 7/1989 | Gens et al. | 423/57 R4 |
| 5,294,428 | 3/1994 | Watson | 423/574.1 |
| 5,352,433 | 10/1994 | Watson | 423/574.1 |

FOREIGN PATENT DOCUMENTS

| | | |
|---|---|---|
| 0165609 | 12/1985 | European Pat. Off. . |
| 0212297 | 3/1987 | European Pat. Off. . |
| 0237216 | 9/1987 | European Pat. Off. . |
| 0252497 | 1/1988 | European Pat. Off. . |
| 0328820 | 8/1989 | European Pat. Off. . |
| 3735002 | 4/1989 | Germany . |
| 2173780 | 10/1986 | United Kingdom . |
| 2187444 | 9/1987 | United Kingdom . |
| 2187445 | 9/1987 | United Kingdom . |

*Primary Examiner*—Gary P. Straub
*Assistant Examiner*—Timothy C. Vanoy
*Attorney, Agent, or Firm*—David M. Rosenblum; Larry R. Cassett

[57] ABSTRACT

An improved oxygen-enhanced Claus process for the recovery of sulphur from an acid gas comprising hydrogen sulphide as a furnace in which a part of the hydrogen sulphide content of the acid gas is burned to form sulphur dioxide. The sulphur dioxide then reacts with residual hydrogen sulphide to form sulphur vapor which is condensed out of the resulting gas mixture. One part of the residual gas mixture is then subjected to catalytic stages to bring the reaction between the hydrogen sulphide and sulphur dioxide close to completion. The improvement resides in sending a second part of the gas mixture to an incinerator to convert all its hydrogen sulphide content to sulphur dioxide. After removal of water, the sulphur dioxide is returned to the furnace.

12 Claims, 6 Drawing Sheets

TREATMENT OF GASES

This is a continuation of application Ser. No. 07/834,927, filed Feb. 12, 1992 now abandoned.

BACKGROUND OF THE INVENTION

This invention relates to the treatment of gases. In particular, it relates to treatment of a gas stream comprising hydrogen sulphide.

Gas streams comprising hydrogen sulphide are typically produced as waste products or by-products in many industrial processes. For example, acid gas streams comprising carbon dioxide and hydrogen sulphide are typically produced during oil refinery operations in which sulphur is removed from crude oil. It is necessary to treat such hydrogen sulphide containing streams before discharging them to the atmosphere so as to reduce or remove altogether their content of sulphur-containing gases. One well known, widely practised process for the treating of gas stream comprising hydrogen sulphide is the Claus process. This process is based on the reaction between hydrogen sulphide and sulphur dioxide to form sulphur vapour and water vapour in accordance with the equation:

$$SO_2 + 2H_2S = 2H_2O + 3S$$

Sulphur exists in the vapour phase in a number of different molecular species such as $S_2$, $S_6$ and $S_8$ according to the temperature.

The first stage of the Claus process is to burn approximately a third of the hydrogen sulphide in the incoming gas stream to form sulphur dioxide and water vapour in accordance with the equation:

$$2H_2S + 3O_2 = 2H_2O + 2SO_2$$

This combustion reaction takes place in a suitable furnace and normally air is used as a source of oxygen for the purposes of combustion. Reaction between the sulphur dioxide and hydrogen sulphide starts in the combustion zone and then continues downstream of the combustion zone. It is, however, a feature of the Claus reaction that at the temperature that is created by the combustion of hydrogen sulphide, it is not possible (with air) to convert more than about 75% of the remaining hydrogen sulphide to sulphur by reaction with sulphur dioxide, and typically between 50 to 70% of the hydrogen sulphide is so converted. It is, however, possible to achieve a higher total conversion in the presence of a catalyst at a reaction temperature in the order of 200° to 450° C. by reacting the remaining hydrogen sulphide and sulphur dioxide. Accordingly, after the gases pass out of the furnace they are cooled to a temperature at which the sulphur that is formed in the furnace condenses. The sulphur is thus recovered. The gases are then reheated to a temperature suitable for the performance of a catalysed reaction between hydrogen sulphide and sulphur dioxide, such temperature typically being in the order of 200° C. Typically, two or three stages of catalytic conversion are performed, with the hydrogen sulphide containing gas stream being reheated immediately upstream of each stage and resulting sulphur being separated from the gas stream by condensation immediately downstream of each stage. The resulting gas mixture now containing only a relatively low concentration of sulphur-containing gases is then typically passed to a tail gas clean-up process or is incinerated. Suitable tail gas clean-up processes include the Scot, Beavon and Stretford processes.

In order to improve the conventional Claus process, it is now well known to use pure oxygen or oxygen-enriched air instead of air unenriched in oxygen to support combustion of the hydrogen sulphide. This substitution reduces the proportion of nitrogen in the gas stream that flows through the Claus plant and accordingly enables a plant of given size to be uprated. In practice, however, in many plants, the amount of uprating that can be achieved by this method is limited as there is a tendency for the reduced volume of nitrogen to lead to higher temperatures within the furnace that cannot be withstood by the waste heat boiler associated with the furnace or by the refractory lining of the furnace. Indeed, the more concentrated in hydrogen sulphide the gas stream, the less becomes the amount of uprating can be achieved by simple substitution of oxygen for air.

There have therefore been a number of proposals in the art to tackle the problem of excessive temperature rise that can be caused by the substitution of oxygen for air. In EP-A-0 165 609 it is disclosed that enriching the combustion air with oxygen to a level of 70 mole percent oxygen produces a calculated theoretical adiabatic flame temperature of about 3750° F. (2065° C.), but that by recycling part of the gas stream leaving the first sulphur condenser (which is intermediate the furnace and the first catalytic stage) to the furnace itself so as to moderate the flame temperature, this temperature can be kept to below 2800° F. (1538° C.) while achieving an increase in throughput of hydrogen sulphide in the range of 50 to 100% by volume. This result can be achieved since the recycle stream consists largely of water vapour (steam) which has a higher molar heat capacity than nitrogen. A number of alternative methods of moderating the flame temperature have been proposed. For example, GB-A-2 173 780 proposes that the temperature be moderated simply by introducing liquid water into the flame zone. In EP-A-0-252-497 it is proposed to use a temperature moderating stream of sulphur dioxide. The sulphur dioxide may be imported or generated by burning a small fraction of hydrogen sulphide feed or liquid sulphur product in a separate process unit. Alternatively, it can be generated from a 'back end' Claus process stream (which generally contains about 3 moles per 100 moles of hydrogen sulphide feed). Additional advantages that can be obtained from this method are reduced oxygen consumption, increased percentage conversion of hydrogen sulphide and an increase in the capacity of the furnace in which the hydrogen sulphide is burnt.

An alternative approach to using pure oxygen or oxygen-enriched air to improve the capacity or throughput of a Claus process is to conduct the combustion of the hydrogen sulphide in two separate furnaces. Accordingly, the overall amount of heat generated by the combustion is allocated between the two furnaces without the need to employ an external or recycled moderator of temperature. Such a process is described in GB-B-2 187 445. In a variation of this approach, a minor part of the hydrogen sulphide containing feed stream can be fully combusted in a first furnace using substantially pure oxygen to support the combustion and a recycle stream of sulphur dioxide and water vapour to moderate the temperature in the first furnace. A part of the resulting gas mixture is cooled and introduced into a second or main furnace so as to reduce the amount of sulphur dioxide that needs to be formed therein by the combustion of hydrogen sulphide. Examples of such a process are described in GB-B-2 187 444 and EP-A-0 290 286. Staging the combustion over two furnaces makes it possible to gain a greater increase in capacity and hydrogen sulphide throughput than is typically possible from a process using but a single furnace with introduction of a moderator into the flame zone so as to moderate the temperature of an oxygen-enhanced flame.

The prior processes discussed above all concentrate on the use of pure oxygen or oxygen-enriched air to improve the throughput or capacity of a Claus plant including one or more furnaces and one or more catalytic stages. One of the main contributions to the capital and running costs of a Claus plant is from the catalytic stages. The catalyst is relatively expensive and requires periodic replacement. Moreover, reheat means is required upstream of each stage. A need to reduce the number of catalytic stages employed for a given percentage conversion of the hydrogen sulphide in the feed gas is identified in EP-A-0 328 820. EP-A-0 328 820A discloses using at least three and typically four furnaces to increase the amount of conversion of hydrogen sulphide that takes place upstream of the catalytic stage or stages. Each such furnace employs pure oxygen or oxygen-enriched air to support combustion of hydrogen sulphide. The number of furnaces employed is itself a disadvantage.

SUMMARY OF THE INVENTION

One aim of the present invention is to provide a method and apparatus that make possible the achievement of high effective percentage conversions of hydrogen sulphide to sulphur upstream of any catalytic reactor in which residual hydrogen sulphide is reacted with sulphur dioxide.

According to the present invention there is provided a method of recovering sulphur from a feed gas comprising hydrogen sulphide comprising the steps of:

a) carrying out combustion of a part of the hydrogen sulphide content of:
   a gas stream comprising feed gas in at least one furnace to form sulphur dioxide and water vapour;

b) supplying oxygen-rich gas (to support the combustion of said part of the hydrogen sulphide) at a rate such that the volumetric flow rate of oxygen into the furnace is less than half the volumetric flow rate of hydrogen sulphide into the furnace;

c) allowing remaining hydrogen sulphide in the gas stream to react in the furnace with sulphur dioxide formed by the combustion of the hydrogen sulphide, thereby producing sulphur vapour and water vapour;

d) separating sulphur vapour from a stream of gas mixture comprising hydrogen sulphide, sulphur dioxide, sulphur vapour and water vapour withdrawn from the furnace;

e) reacting with oxygen-rich gas at least part of the gas stream from which sulphur has been separated, all the hydrogen sulphide in said part of the gas stream being fully oxidised to sulphur dioxide and water vapour;

f) separating water vapour from the gas stream produced by step e);

g) returning to the furnace (or at least one of the furnaces) at least part of the gas stream from which water vapour has been separated and reacting in such furnace sulphur dioxide in the returning gas stream with hydrogen sulphide in the feed gas; and h) taking part of the gas stream from the end of said step d) or the end of said step f) (or both) for further treatment.

The invention also provides apparatus for recovering sulphur from a feed gas comprising hydrogen sulphide, comprising:

a) at least one furnace for burning a part of the hydrogen sulphide content of the feed gas stream;

b) means for supplying said feed gas and oxygen-rich gas to at least one burner firing into the furnace;

c) means downstream of the furnace for separating sulphur vapour from a gas stream comprising hydrogen sulphide, sulphur dioxide, sulphur vapour and water vapour withdrawn from the furnace in use of the apparatus;

d) a reactor for reacting oxygen-rich gas with hydrogen sulphide communicating with an outlet for said gas stream from said sulphur vapour separation means; whereby at least a part of the stream is able to enter the reactor and the hydrogen sulphide content of that part is able to be fully oxidised to sulphur dioxide and water vapour;

e) separating means, in communication with an outlet from the reactor, for separating water vapour from a gas stream produced by the reactor;

f) means for returning to the furnace (or at least one of the furnaces) at least part of the resulting water-depleted gas stream so as to enable sulphur dioxide in the returning gas to react with hydrogen sulphide in the feed gas; and g) means for taking from one or both of the sulphur vapour separation means and the water vapour separation means a gas stream for further treatment.

By the term "oxygen-rich" as used herein is meant oxygen-enriched air or commercially pure oxygen. It is preferred to keep impurities in the oxygen to a minimum. Accordingly, commercially pure oxygen is preferred to oxygen-enriched air, and if the latter is used, its oxygen content is preferably high, say, 80% by volume or more.

Preferably, step (a) of the method according to the invention is performed in a single furnace. By fully oxidising the hydrogen sulphide content of the gas stream passing through the reactor and then returning the resulting gas stream to the furnace, high effective conversion efficiencies (i.e. relative to fresh feed gas), typically of over 80%, may be achieved in the furnace even though appreciably less than one third of the hydrogen sulphide is burnt therein. The separation of water, producing a gas stream rich in sulphur dioxide, helps to enhance this effect and to reduce (in comparison with conventional or other oxygen-using processes) the total amount of gas flow that needs to be handled by downstream parts of the apparatus according to the invention. In particular, more efficient overall conversion of hydrogen sulphide to sulphur vapour is made possible.

In one preferred example of a method and apparatus according to the invention, only a part of the stream from which sulphur vapour is separated is returned to the furnace. Another part (preferably the remainder) is subjected to at least one, and preferably two or three stages of catalytic reaction between its hydrogen sulphide content and its sulphur dioxide content. For a given rate of passing feed gas to the furnace, the method according to the invention makes it possible to reduce the amount of gas per unit time that the stages of catalytic reaction between hydrogen sulphide and sulphur dioxide have to handle and makes possible the achievement of higher overall conversion efficiencies. The part of the stream which is subjected to the said stages of catalytic reaction between its hydrogen sulphide and its sulphur dioxide content, is typically heated upstream of each such stage. If desired, the whole stream from which the sulphur has been separated may be heated upstream of being divided.

The proportion of the gas stream from the sulphur separator that is passed to the reactor is preferably as large as possible having regard to the operating constraints on the furnace. It is desirable that the mole ratio of hydrogen sulphide to sulphur dioxide in the gas stream from the sulphur separator approximates to the stoichiometric value of two to one. The greater the rate of recycling gas to the furnace or furnaces, the less is the combustion of hydrogen sulphide that needs to be performed in the furnace to give a chosen mole ratio of hydrogen sulphide to sulphur dioxide typically in the order of 2 to 1. The less the amount of hydrogen sulphide burned per unit time, the lower is the resulting flame temperature. There are a number of factors which may set a minimum on the flame temperature and hence a maximum on the rate at which gas can be recycled to the furnace. First, the flame temperature needs to be high enough to give a stable flame. Second, some hydrogen sulphide feeds contain ammonia. It is desirable for the flame temperature to be sufficiently high for such ammonia to be completely incinerated in the flame. Third, there is a tendency for hydrogen sulphide to dissociate into hydrogen and sulphur, which tendency increases with increasing temperature. Such dissociation is advantageous in as much as it reduces the requirements for sulphur to be formed by the reaction between hydrogen sulphide and sulphur dioxide and hence the requirement for oxygen to be supplied to form some of the sulphur dioxide by the combustion reaction with hydrogen sulphide. Accordingly, it may be chosen to operate the furnace with a relatively high flame temperature to take advantage of the dissociation of hydrogen sulphide.

Typically, the flame temperature is chosen to be in the range 1200° to 1600° C. In order to reduce the amount of combustion of hydrogen sulphide in the furnace necessary to produce a desired flame temperature, and hence increase the proportion of the gas stream from the sulphur separator that can be recycled to the furnace, the feed gas stream containing hydrogen sulphide is preferably pre-heated typically to a temperature of at least 300° C. and typically 500° C. or higher. If desired, the gas stream being recycled and the oxygen-rich gas stream supplied to the furnace may also be pre-heated. Pre-heating of the feed gas stream makes possible a significant increase in the proportion of the gas stream from the sulphur separator that can be recycled for a given furnace operating temperature. Accordingly, there is a smaller volume of gas to be handled by downstream parts of the process, which particularly benefits the operation of catalytic reactors in which hydrogen sulphide is reacted with sulphur dioxide.

The gas stream from the water separator may be returned to the flame zone in the furnace, but is preferably added to the furnace at a region downstream of the flame zone, so as not to have any direct temperature moderating effect on the flame zone.

If desired, two furnaces may be employed receiving feed gas in parallel with one another. The composition of the gas fed to one furnace may differ from that fed to the other. For example, in an oil refinery, one furnace may receive a feed comprising a mixture of amine gas (which is free of ammonia and which is sometimes referred to as acid gas) and sour water stripper gas (which contains ammonia) while the other furnace receives only amine gas. This enables the other furnace to be operated, if desired, with a flame temperature insufficient to incinerate all the ammonia. Typically, only one of the two furnaces is the source of the gas mixture that passes to the reactor. This furnace is identified below as the first furnace and the other one as the second furnace. Generally, the first furnace is operated similarly to the furnace of an apparatus according to the invention that employs just one furnace to receive hydrogen sulphide feed.

Only part of the gas stream from the sulphur separator associated with the first furnace need be passed to the reactor. The remainder is preferably introduced into the second furnace with a part of the feed gas. The hydrogen sulphide feed to the second furnace is preferably pre-heated typically to a temperature of at least 300° C. Oxygen-rich gas is preferably used to support combustion of a part of the hydrogen sulphide in the second furnace. Part of the gas stream from the water separator is preferably introduced into the second furnace. it may be supplied to the flame zone or introduced into the gas stream downstream of the flame zone. The sulphur dioxide contributed by the gas stream from the water separator reduces the amount of combustion that needs to be performed in the second furnace. If desired, all of the gas stream from the sulphur separator associated with the first furnace may be passed to the reactor. It is then necessary to supply a part of the gas mixture from the water separator to the second furnace to react with hydrogen sulphide feed.

In examples in which two furnaces receive hydrogen sulphide containing feed in parallel, the gas mixture leaving the second furnace preferably has sulphur vapour separated therefrom and is then subjected to one or more stages of catalytic reaction of hydrogen sulphide with sulphur dioxide. Accordingly the mole ratio of hydrogen sulphide to sulphur dioxide in this gas mixture is preferably about two to one. However, there is no such preference for the gas stream leaving the first furnace, and accordingly using a second furnace can widen the choice of operating parameters for the first furnace. The advantage of obtaining a high effective percentage conversion of the hydrogen sulphide (i.e. relative to fresh feed) upstream of any catalytic reactors in which hydrogen sulphide is reacted with sulphur dioxide to form sulphur vapour is still obtained when two furnaces receive hydrogen sulphide feed in parallel.

The sulphur vapour is preferably separated by condensation.

In step (e) of the method according to the invention, the total oxidation of the hydrogen sulphide content of at least part of the gas stream from which sulphur vapour has been condensed may be performed at least in part catalytically but is preferably performed without the use of catalyst. Suitable catalysts include those that are used in the incineration of a gas stream that has been treated in a tail gas clean up plant forming part of a Claus plant. The temperature of the reaction is desirably controlled by adding water or steam to the gas mixture or by heat exchange. The reaction temperature is typically kept below 1000° C. An excess of oxygen is preferably employed to ensure that no traces of hydrogen sulphide leave step (e) of the method according to the invention. Typically, the excess oxygen is in the range of 1 to 2% by volume of the gas stream (measured on a dry basis).

The reaction of step (e) may be performed in a plurality of stages with interstage cooling being conducted. The first stage preferably employs no catalyst and is preferably operated with a sub-stoichiometric rate of oxygen, with the temperature kept below 1600° C. The resulting gas mixture is then cooled to a temperature preferably close to but greater than the dew point of sulphur. The destruction of the hydrogen sulphide and any sulphur vapour present may be completed in a second stage by reaction with oxygen in the presence or absence of a catalyst. The flow of reactants into the second stage is able to be closely controlled so as to ensure the complete combustion of all the hydrogen sulphide and sulphur vapour entering step (e) of the method according to the invention while avoiding the formation of sulphur trioxide. In general, a two stage reaction is preferred to a single stage one, since the temperature in the two stage reaction can readily be controlled without the addition of water or steam to the reacting gas mixture. Accordingly, the size of each reactor can be kept relatively small. If desired, sulphur vapour formed in the first by reaction between hydrogen sulphide and sulphur dioxide may be separated from the gas stream intermediate the first and second stages, but it is generally preferred not to perform such a separation as it will increase the size of the first stage reactor for a given flow rate of sulphur dioxide and will require an additional condenser (or other separator to be installed).

In step (f) of the method according to the invention, the water vapour is preferably separated by condensation. Step (f) is preferably operated by countercurrently contacting the gas mixture with an aqueous medium, and withdrawing the resulting gas mixture at a first temperature, and the aqueous medium at a second temperature in excess of the first temperature. The first temperature is preferably so selected that the gas mixture is relatively free of water vapour and is typically below 50° C., e.g. in the range of 25° to 30° C. The second temperature is preferably so selected that the aqueous medium is relatively free of dissolved sulphur dioxide and is preferably at least 90° C. and more preferably between 95° and 110° C. depending on operating pressure. The countercurrent contact between the aqueous medium and the gas mixture is therefore preferably performed in a column containing means, e.g. a packing for facilitating intimate contact between an ascending gas phase and a descending liquid phase. If desired, the aqueous medium (preferably water) may be subjected to steam stripping downstream of its contact with the gas mixture, so as to reduce further its sulphur dioxide content.

Passage of at least part of the gas stream from which water vapour has been separated to a furnace receiving hydrogen sulphide feed enables exceptionally high ratios of hydrogen sulphide to oxygen to be employed therein. For example, the ratio may be kept between 5:2 and 4:1.

BRIEF DESCRIPTION OF THE DRAWINGS

Methods and apparatuses according to the invention will now be described by way of example with reference to the accompanying drawings, in which.

In the drawings and the ensuing description, like parts occurring in different Figures are given the same reference numerals.

DETAILED DESCRIPTION

Figure 1:
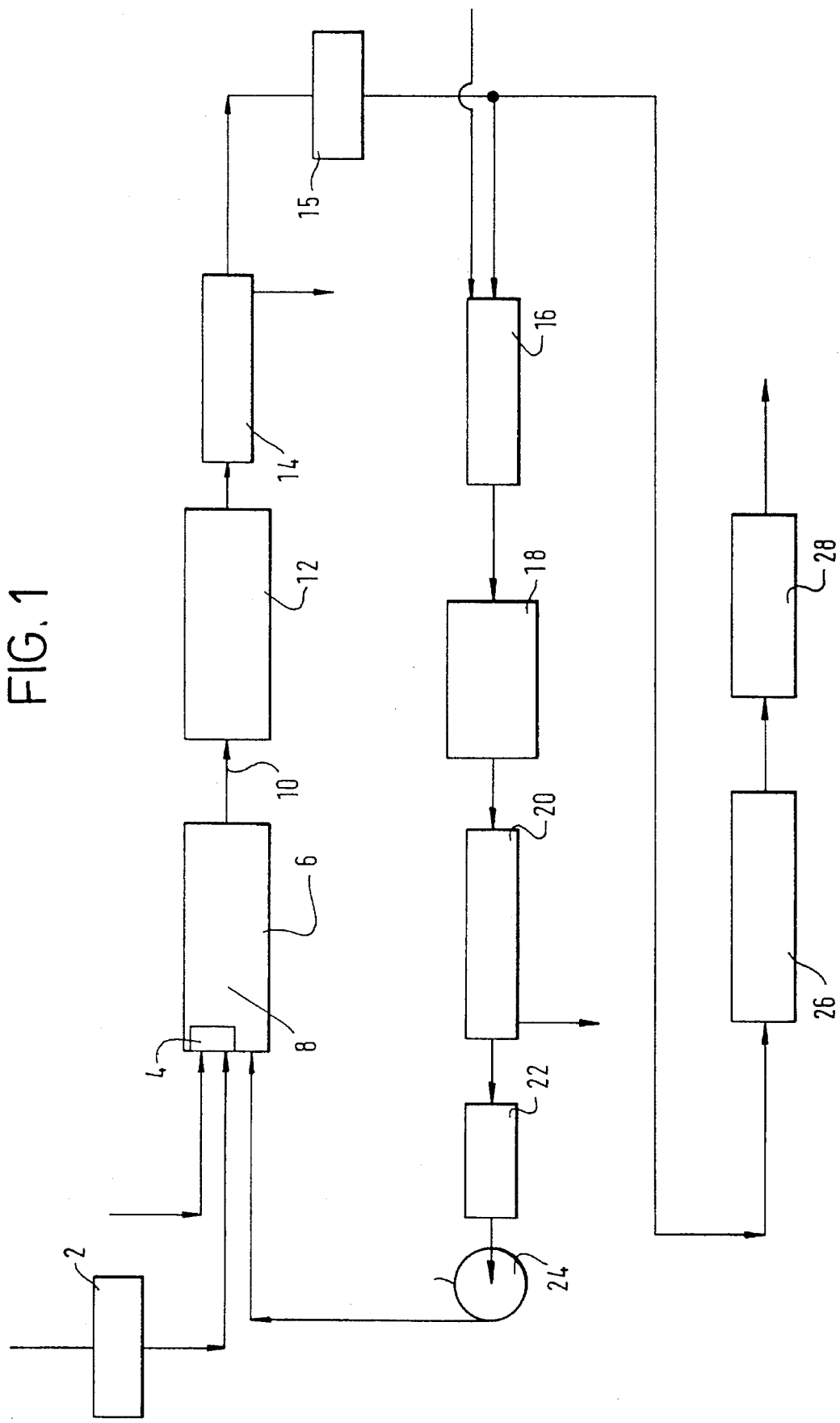
FIG. 1 is a schematic flow diagram of a first sulphur recovery plant according to the invention employing just one furnace.

Referring to FIG. 1 of the drawings, a feed gas stream comprising hydrogen sulphide is heated in a heat exchanger 2 from ambient to an elevated temperature (typically about 500° C.). The heat exchange may be performed against a countercurrent flow of hot fluid which derives its temperature at least partly from heat generated in other parts of the process or from any other readily available source of heat. The resulting pre-heated feed gas stream comprising hydrogen sulphide then flows into a burner 4 that fires into a furnace 6. Although not shown, the pre-heated hydrogen sulphide containing feed gas stream may, if desired, be distributed between a plurality of burners that fire into the furnace 6. A stream of oxygen is also passed into the burner 4 in order to support combustion of some of the hydrogen sulphide content of the feed gas stream. The combustion reaction between hydrogen sulphide and oxygen proceeds in accordance with the equation:

$$2H_2S+3O_2=2H_2O+2SO_2$$

The burner 4 is typically of a kind in which the flame length and temperature distribution can be controlled such that the flame does that so as not to impinge upon or so near to any refractory lining of the furnace that damage is caused to the lining or the furnace.

The sulphur dioxide that is formed by combustion of a part of the hydrogen sulphide content of the feed gas stream reacts with hydrogen sulphide to form sulphur vapour and water vapour in accordance with the equation:

$$4H_2S+2SO_2=4H_2O+3S_2(v)$$

Considering the stoichiometry of the two chemical reactions set out above, it can be appreciated that the stoichiometric rate of supplying oxygen-rich gas, preferably in the form of commercially pure oxygen, is a half that at which hydrogen sulphide is supplied to the furnace. Preferably, however, the oxygen-rich gas is supplied to the burner 4 at a rate substantially below the stoichiometric one. Reaction between the sulphur dioxide and hydrogen sulphide starts in the actual flame zone 8 within the furnace 6 and continues in those parts of the furnace intermediate the flame zone 8 and the outlet 10 of the furnace. Recycled sulphur dioxide, whose formation shall be described below, is introduced directly into the reaction region of the furnace intermediate the flame zone 8 and the outlet 10. The introduction of this sulphur dioxide enhances the amount of reaction between hydrogen sulphide and sulphur dioxide that takes place in the furnace and thus increases the formation of sulphur vapour. The flame 8 is typically operated so as to keep the refractory lining below a maximum temperature typically in the range 1400° to 1650° C. depending on the choice of refractory. It is to be appreciated that local temperatures within the flame 8 well in excess of 1650° C. are nonetheless created. In addition to the reactions described above, some dissociation of hydrogen sulphide into hydrogen and sulphur takes place.

The gas stream comprising hydrogen sulphide, sulphur dioxide, water vapour, sulphur vapour and hydrogen formed by the dissociation of hydrogen sulphide flows out of the furnace 6 through the outlet 10. The gas stream is then reduced in temperature typically to a value in the range of 300° to 400° C. by passage through a waste heat boiler 12. Further cooling of the gas stream and condensation of essentially all its sulphur vapour content is performed in a condenser 14. The liquid sulphur condensate is separated from the gas mixture in the condenser 14 and is typically passed to a sulphur seal pit (not shown). The gas mixture leaving the condenser 14 typically consists essentially of hydrogen sulphide, sulphur dioxide, hydrogen and water vapour and is at a temperature of about 140° C. The ratio of hydrogen sulphide to sulphur dioxide in the stream is typically approximately the stoichiometric one of 2:1. Accordingly, the ratio of the molar rate of supply of hydrogen sulphide to the furnace 6 to that of oxygen is well in excess of 2:1. The total content of hydrogen sulphide and sulphur vapour in the stream is however less than the content of water vapour. The gas stream may also contain gases which do not take part in the reaction. For example, the feed gas stream may unavoidably contain carbon dioxide and nitrogen. Some nitrogen and argon may also be contributed to the gas mixture leaving the furnace 6 by the oxygen-rich gas. The nitrogen and argon content of the oxygen-rich gas is therefore preferably kept to a minimum by employing commercially pure oxygen as the source of the oxygen-rich gas. Nitrogen and carbon dioxide may also be formed by combustion, for example, of ammonia or hydrocarbon contained in the feed stream.

Figure 5:
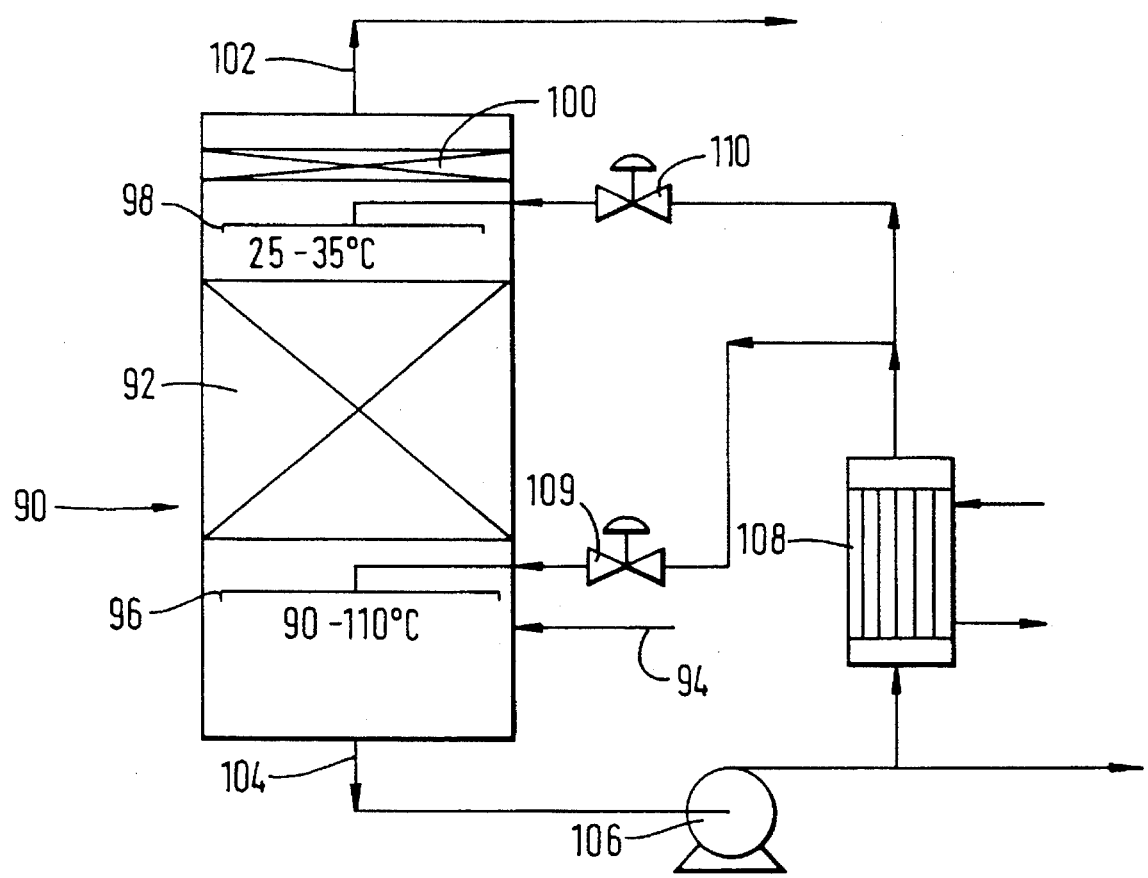
FIG. 5 is a schematic flow diagram of a water separator for use in the plants shown in FIGS. 1 to 3.
Figure 6:
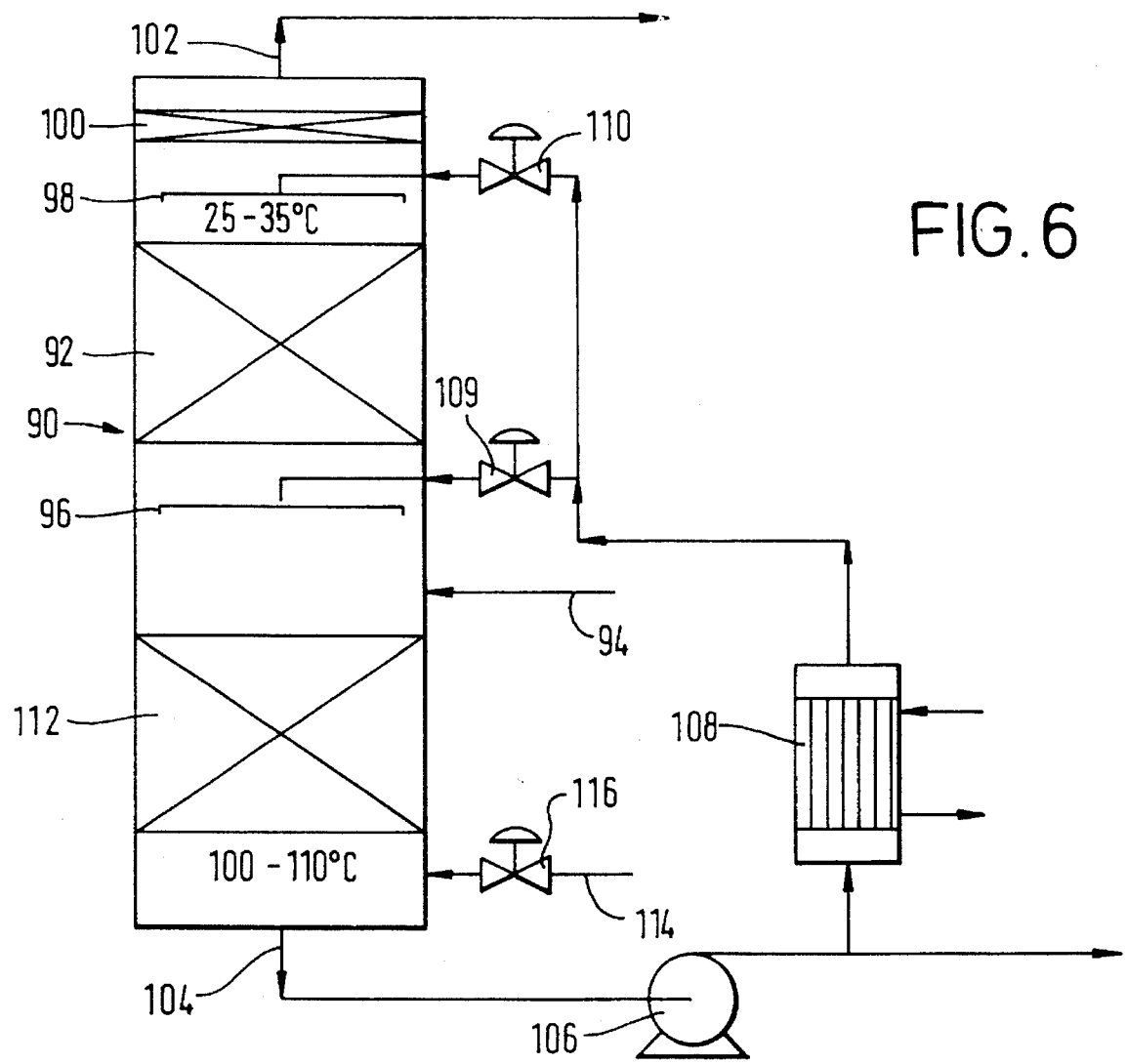
FIG. 6 is a schematic flow diagram of an alternative water separator for use in the plants shown in FIGS. 1 to 3.

The gas stream leaving the condenser 14 may, if desired, be reheated in a heater 15 to a temperature of about 230° C. and is divided into a first subsidiary stream and a second subsidiary stream. The first subsidiary stream is passed to a reactor or incinerator 16 in which all its hydrogen sulphide content is fully oxidised to sulphur dioxide and water vapour by reaction with oxygen-rich gas which is preferably pure oxygen. The operation of the incinerator 16 is described below with reference to FIG. 4 of the accompanying drawings. The gas mixture leaving the incinerator 16 consists essentially of sulphur dioxide and water vapour. This gas stream is typically cooled to a temperature in the order of 200° C. in a heat recovery installation 18 such as a heat exchanger or waste heat boiler. The cooled gas stream is then passed into a water vapour separator 20 in which water vapour is removed from the gas stream. Two alternative embodiments of the separator 20 are shown in FIGS. 5 and 6 of the accompanying drawings. Both embodiments employ water to condense the water vapour and are operable such that substantially all the water vapour can be condensed whilst avoiding the formation of a liquid effluent containing such significant quantities of sulphurous or sulphuric acid that problems arise in its handling or disposal.

It is important to ensure that all the hydrogen sulphide content of the major subsidiary stream is destroyed by oxidation to sulphur dioxide and water vapour in the incinerator 16 since any residual hydrogen sulphide would continue to react with sulphur dioxide with the result that not only water vapour but also sulphur vapour would be condensed in the separator 20, thus requiring the addition of a system for separating water from sulphur.

The gas stream leaving the condenser 20 comprises sulphur dioxide from which substantially all of the water vapour has been separated. The sulphur dioxide does however contain small amounts of water vapour and will also contain some small proportion of oxygen as a result of the excess oxygen used in the incinerator 16. This gas stream leaves the separator 20 as a gas saturated in water vapour at a temperature typically in the range of 25° to 35° C. It is then heated to a higher temperature, say 50° C., by means of heater 22. This heating step renders the gas mixture less aggressive to apparatus in which it is handled, particularly the blades of a fan or blower 24 which is employed to recirculate the gas stream comprising sulphur dioxide to the furnace 6. It is this gas stream which is the source of the sulphur dioxide that is introduced into the furnace 6 intermediate its flame zone 8 and its outlet 10.

The second subsidiary stream formed by dividing the gas stream leaving the condenser 14 is subjected to further treatment comprising reacting its hydrogen sulphide content with its sulphur dioxide content so as to remove substantially all the sulphur containing gases therefrom. Accordingly, the second subsidiary gas stream flows through a plurality of catalytic stages shown generally by the reference numeral 26 in FIG. 1, each comprising, in sequence, first a heat exchanger or other heating means (not shown) in which the temperature of the gas mixture is raised to a value suitable for the catalytic reaction of hydrogen sulphide with sulphur dioxide (typically in the order of 190° to 250° C.), second, a reactor (not shown) comprising beds of catalyst (for example, activated alumina) of the reaction between hydrogen sulphide and sulphur dioxide, and, third, a condenser (not shown) for separating sulphur from the resulting gas mixture comprising sulphur dioxide, hydrogen sulphide, water vapour and sulphur vapour. In the first stage of catalytic reaction, there is no need to provide any heating means in addition to the heater 15, since the heater is effective to raise the temperature of the gas stream to a value suitable for the catalytic reaction between hydrogen sulphide and sulphur dioxide. Typically, two or three such stages 26, each comprising heating, catalytic reaction between sulphur dioxide and hydrogen sulphide, and condensation of sulphur vapour are used. The resulting gas stream typically containing less than 5% of the sulphur atoms contained in the feed gas is then passed to a tail gas clean-up unit 28 which may be of any conventional kind (e.g. one operating the Scot, Beavon or Stretford process).

Separation of the water vapour from the first subsidiary stream in the condenser 20 has a beneficial effect on the equilibrium conditions in the furnace 6, as well as reducing the overall flow rate of fluid through the catalytic reaction stages 26. Accordingly, these catalytic stages can be made smaller. The higher effective conversion efficiency in the furnace 6 makes possible the use of two rather than three stages without any significant loss in overall conversion of hydrogen sulphide to sulphur in comparison to that obtained in a conventional Claus process with three catalytic stages, or for the use of three catalytic stages 26 with a higher degree of conversion. Since the flow of gas through the catalytic stages is reduced, the tail gas clean-up unit may be made smaller for a given flow rate of feed gas comprising hydrogen sulphide.

A simplified example of the operation of an apparatus as shown in FIG. 1 of the drawings has been calculated and is set out below. A number of approximations and assumptions have been made.

A feed gas stream comprising 100% by volume of hydrogen sulphide is pre-heated in the heat exchanger 2 to a temperature of 500° C. and is introduced into the furnace 6 through the burner 4 at a rate of 82 kmol/hr. Pure oxygen is also fed to the burner 4 at a rate of 23 kmol/hr. All the oxygen reacts in the flame zone 8 of the furnace 4 with hydrogen sulphide. The resulting gas mixture accordingly comprises 66.67 parts by volume of hydrogen sulphide, 15.33 parts by volume of sulphur dioxide and 15.33 parts per volume by water vapour. Recycle sulphur dioxide is mixed with this gas at a rate of 18 kmol. A gas mixture comprising 20 parts per volume of hydrogen sulphide, 10 parts per volume of sulphur dioxide, 62 parts by volume of water vapour and 35 parts by volume of sulphur vapour (assumed all to be the dimer $S_2$) leaves the furnace C ignoring any dissociation of hydrogen sulphide that takes place in the furnace 4). The gas stream is cooled in the waste heat boiler 12 and then sulphur vapour is condensed out of the mixture in the condenser 14. The gas stream leaving the condenser 14 is divided into first and second streams. The undivided stream flows at a rate of 92 kmol/hr. The first stream flows at a rate of 55.2 kmol/hr and the second stream at a rate of 36.8 kmol/hr. The first stream is passed through the incinerator 16 and its sulphur content is converted by reaction with oxygen to sulphur dioxide and water vapour. The water vapour is condensed in the separator 20 and water is recovered at a rate of 49.2 kmol/hr. It is assumed that no water vapour is added to the gas mixture to control the temperature of the incinerator 16, and that the separator 20 is effective to remove all the water but none of the sulphur dioxide. These assumptions are not wholly correct. The remaining gas now comprising sulphur dioxide essentially free of other components is then heated to a temperature of 120° C. in the heater 22 and provides the flow of sulphur dioxide which is mixed with the gases leaving the flame zone 8 in the furnace 4. It is assumed that a stoichiometric amount of oxygen is used in the incinerator 16, although in practice a small excess is typically employed in order to ensure that all the hydrogen sulphide is fully oxidised to sulphur dioxide and water vapour in the incinerator 16.

The second stream flows to the catalytic stages 26 and then to the tail gas clean-up unit 28.

We have compared the results of the above calculation with those for a conventional process in which hydrogen sulphide is passed to the furnace at a rate of 82 kmol/hr, without pre-heating; air rather than oxygen is used to support combustion, and there is no recycle of any gas. On the basis of this comparison, we find that whereas the flow of gas out of the furnace 4 in the method according to our invention is less than 60% of the corresponding conventional flow, the flow rate of gas to the catalytic stages 26 is a mere 16% of the corresponding flow rate in a conventional process at an assumed furnace conversion of 70%. It can be appreciated that as a result of this substantially reduced flow to the catalytic stages, the stages themselves may be made smaller than conventional. In practice, it is not likely that a feed consisting of pure hydrogen sulphide will be available: rather the hydrogen sulphide feed gas typically contains other components, for example carbon dioxide. As the hydrogen sulphide becomes more dilute, so the size of the advantages obtained will tend to be diminished. Nonetheless, we believe that methods according to the invention will give a useful advantage if the hydrogen sulphide content of the feed gas stream is 50% by volume or more. The advantages will be more marked when the hydrogen sulphide content of the feed gas stream is more than 70% by volume.

It is also to be appreciated that the recycle of the sulphur dioxide increases substantially the effective feed conversion in the furnace 4. Accordingly, although in the example, the actual conversion is assumed to be 70%, the effective feed conversion is 85.37%.

Figure 2:
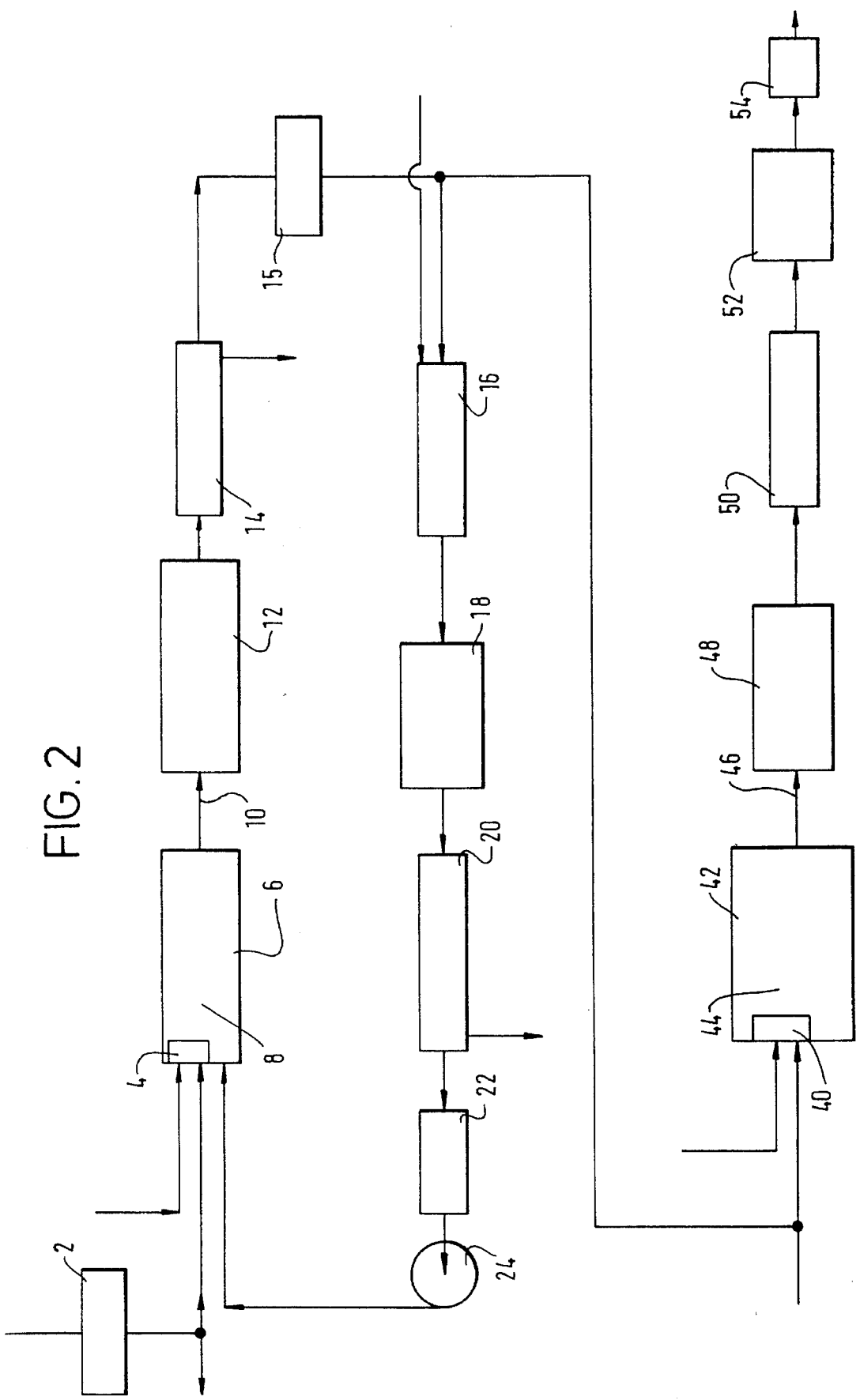
FIG. 2 is a schematic flow diagram of another sulphur recovery plant according to the invention which employs two furnaces.

Referring now to FIG. 2 of the drawings, the plant shown in FIG. 2 differs from that shown in FIG. 1 in the treatment afforded to the minor subsidiary gas stream formed by dividing the flow leaving the heater 15. Accordingly, only those parts of the plant shown in FIG. 2 used to treat the minor stream shall be described below.

Referring to FIG. 2, the second subsidiary stream is mixed with a stream of pre-heated hydrogen sulphide at a temperature of 500° C. The resulting mixture is passed to a burner 40 which fires into a furnace 42. The burner 40 also receives a supply of oxygen-rich gas (preferably pure oxygen). In the flame zone 44 produced by operation of the burner 40 within the furnace 42, the oxygen reacts with the hydrogen sulphide content of the mixed gas stream. A resulting gas stream comprising hydrogen sulphide, sulphur dioxide and water vapour leaves the furnace 42 through an outlet 46. The gas stream is then cooled typically to a temperature in the order of 300° C. in a waste heat boiler 48. The gas stream then passes through a condenser 50, in which sulphur vapour is separated therefrom by being condensed, the resulting liquid sulphur being passed to a sulphur seal pit (not shown). The gas stream from which the sulphur vapour has been extracted now flows to a plurality of catalytic stages 52. Each stage 52 comprises, in sequence, first a heat exchanger or other device (not shown) for raising the temperature of the gas mixture to a temperature typically in the range of 190° to 250° C., second a catalytic reactor (not shown) for performing the reaction between hydrogen sulphide and sulphur dioxide to form sulphur vapour and water vapour, and third a condenser (not shown) for condensing sulphur vapour from the mixture. By using three such catalytic stages 52, at least 97% of the hydrogen sulphide in the feed gas stream may be converted to sulphur. The residual sulphur containing gases flow from the catalytic stages 52 into a conventional tail gas clean-up unit 54.

An example of the operation of the plant shown in FIG. 2 has been calculated in a manner similar to the example of the operation of the plant shown in FIG. 1. The example is identical, save for the treatment of the second subsidiary stream. The second subsidiary stream flowing at a rate of 36.8 kmol/hr and comprising 8 parts by volume of hydrogen sulphide, 4 parts by volume of sulphur dioxide and 24.8 parts by volume of water vapour is mixed with a flow of 8 kmol/hr of hydrogen sulphide pre-heated to a temperature of 500° C. This gas mixture is supplied to the burner 40 along with a stream of pure oxygen at a flow rate of 4 kmol/hr. The combustion reaction between the oxygen and the hydrogen sulphide forms a gas mixture comprising 13.3 parts per volume of hydrogen sulphide, 6.67 parts per volume of sulphur dioxide and 27.47 parts by volume of water vapour (ignoring any reaction between sulphur dioxide and hydrogen sulphide). Reaction takes place between the hydrogen sulphide and sulphur dioxide in the furnace 42 and the gas mixture leaves this furnace 42 through its outlet 46 at a temperature of about 950° C. The reaction between hydrogen sulphide and sulphur dioxide continues through the waste heat boiler 48 and a gas stream leaves the waste heat boiler 48 at a flow rate of 49.75 kmol/hr comprising 4.19 parts by volume of hydrogen sulphide, 2.09 parts by volume of sulphur dioxide, 36.61 parts by volume of water vapour and 6.86 parts by volume of sulphur vapour (assumed all to be in its dimeric form $S_2$). Sulphur is condensed out of this gas stream in the condenser 50. Further reaction between the remaining hydrogen sulphide and sulphur dioxide takes place in the catalytic stages 52, and the resulting gas stream is then subjected to treatment in the tail gas clean-up plant 54 before being discharged to the atmosphere.

The flow of the gas mixture to the catalytic stages is, as in the plant shown in FIG. 1, only a small fraction of the corresponding flow in a conventional plant.

Figure 3:
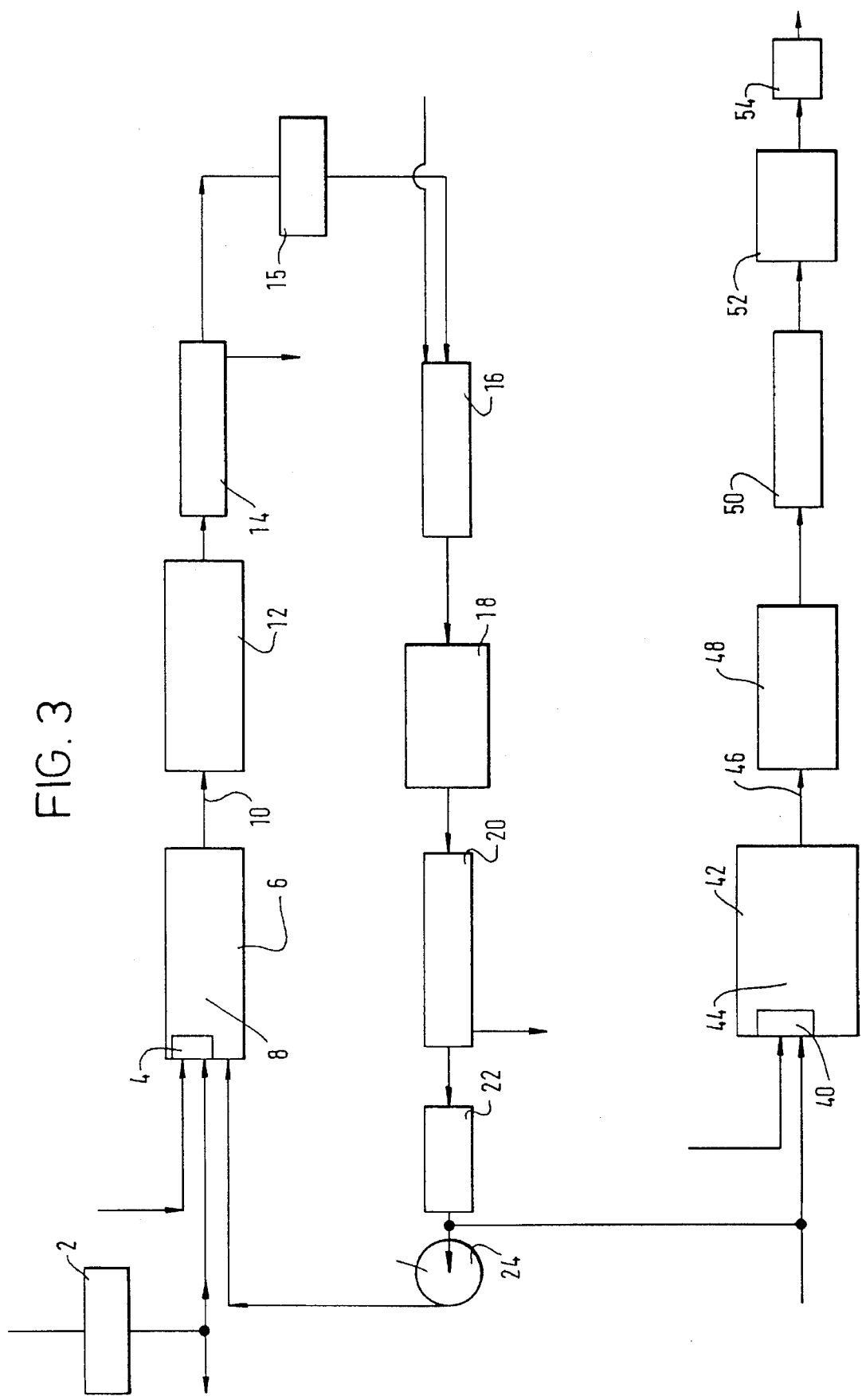
FIG. 3 is a schematic flow diagram of yet another sulphur recovery plant according to the invention employing two furnaces.

Referring to FIG. 3 of the drawings, the plant shown therein comprises the same units as that shown in FIG. 2 of the drawings. The only difference between the two plants is that whereas in the plant shown in FIG. 2, the gas stream leaving the heater 15 is divided into first and second subsidiary streams, in the plant shown in FIG. 3 all this gas stream flows to the incinerator 16. Accordingly, not all the gas stream leaving the heater 22 is returned to the furnace 4. Rather, the gas stream leaving the heater 22 is divided into major and minor streams, the major one being mixed with a portion of the pre-heated hydrogen sulphide feed gas stream upstream of the burner 40, and the minor stream being recycled by the fan 24 to the furnace 4.

The furnace 42 shown in FIG. 3 is however substantially larger than the corresponding furnace shown in FIG. 2, and it is contemplated that whereas in operation of the plant shown in FIG. 2, the vast majority of the feed gas comprising hydrogen sulphide passes to the furnace 4 rather than the furnace 42, in operation of the plant shown in FIG. 3, more of the hydrogen sulphide feed gas flows to the furnace 42 than to the furnace 4. Accordingly, there is a correspondingly larger flow of oxygen-rich gas to the furnace 42 than to the furnace 4.

Figure 4:
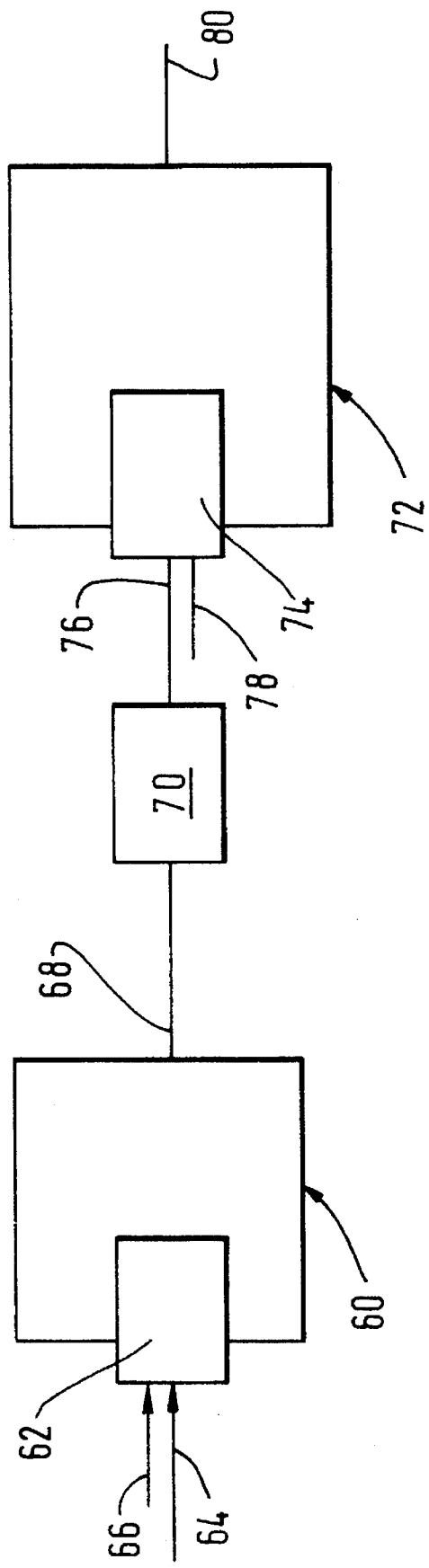
FIG. 4 is a schematic flow diagram of an incinerator for use in the plants shown in FIGS. 1 to 3.

Referring now to FIG. 4 of the drawings, there is shown a hydrogen sulphide incineration apparatus that may be used as any of the incinerators 16 shown in FIGS. 1 to 3. The incinerator shown in FIG. 4 comprises a first furnace 60 into which a burner 62 fires. The burner 62 has a first inlet 64 for the hydrogen sulphide containing gas mixture and a second inlet 66 which communicate with a source of oxygen-rich gas (not shown), preferably pure oxygen. The relative rates of supply of oxygen and hydrogen sulphide containing gas mixture to the burner 62 are selected so as to ensure that the temperature of the gas mixture leaving the furnace 60 through an outlet 68 does not exceed, say, 1600° C. Accordingly, the rate of supply of oxygen relative to that of hydrogen sulphide is below the stoichiometric value necessary for complete combustion of the hydrogen sulphide.

The gas mixture leaving the furnace through the outlet 68 is then cooled in a heat recovery device 70 (e.g. a waste heat boiler) to a temperature a little above that at which sulphur consenses. Accordingly, sulphur formed by reaction between the hydrogen sulphide and sulphur dioxide passes through the heat recovery device 70 with the other components of the gas stream. This gas stream then flows into an inlet 76 of a second burner 74 that fires into a second furnace 72. The burner 74 has a second inlet 78 for oxygen-rich gas (preferably pure oxygen). The rate of supplying pure oxygen is chosen so as to ensure that there is complete combustion of all the hydrogen sulphide and sulphur vapour content of the gas mixture entering the burner 74. Accordingly, a slight stoichiometric excess of oxygen is supplied. A gas mixture consisting essentially of sulphur dioxide and water vapour leaves the furnace 72 through an outlet 80 typically at a temperature in the range of 600° to 1000° C. and then passes to the heat recovery unit 18 shown in each of FIGS. 1 to 3.

Referring now to FIG. 5 of the accompanying drawings, there is shown a first apparatus suitable for use as the water separator 20 in each of FIGS. 1 to 3. The apparatus comprise a column 90 containing a structured or random packing 92 for effecting intimate contact between the gaseous and liquid phases. The column has, beneath the packing 92, inlet 94 for the mixture of sulphur dioxide and water vapour that leaves the heat recovery unit 18 shown in each of FIGS. 1 to 3 of the accompanying drawings. There is also a cold water distributor 96 located beneath the packing 92 but above the inlet 94. There is thus, in operation, some contact between the water issuing from the distributor 96 and the gas entering the column 90 from the inlet 94. Although the water distributor 96 may be omitted, its operation can typically help to reduce the gas temperature from its inlet temperature of about 200° C. to a value in the range 90° to 110° C. and also has the advantages of reducing the gas velocity through the packing 92 and reducing the rate at which water needs to be supplied to the top of the packing 92.

A second water distributor 98 is located above the packing 92. Cold water is thus in operation caused to flow downwardly through the packing 92 and come into intimate heat and mass transfer relationship with the sulphur dioxide containing gas mixture that ascends the column 90. As the gas flows upwardly through the packing 92 so it is progressively cooled and so there is a transfer of water from the gas phase to the liquid phase. The gas typically passes through the top of the packing 92 at a temperature in the range 25° to 35° C. and is saturated with water vapour at that temperature. The column is provided near its top with a demister 100 so as to disengage droplets of liquid water from the gas. The resulting gas, relatively free of water vapour in comparison to that entering the column 90 through the inlet 94, passes out of the column through an outlet 102 at its top and flows to the heater 22 shown in each of FIGS. 1 to 3.

Transfer of sulphur dioxide from the gas phase to the liquid phase also takes place as the gas ascends the packing 92. As the liquid phase descends the packing this sulphur dioxide returns to the gas phase as the temperature of the liquid progressively increases. Accordingly, the liquid water reaching the bottom of the column 90 is relatively free of dissolved sulphur dioxide typically being at a temperature in the order of 90° to 110° C. depending on the operating pressure of the column 90. (This operating pressure is typically in the range of 100 to 150 kPa (absolute)). The liquid water is withdrawn from the bottom of the column 90 through an outlet 104 at its bottom by a pump 106. A part of the liquid water stream thus withdrawn may be discharged, while the remainder is passed through a heat exchanger 108, cooled by water, in which it is reduced in temperature typically to a temperature in the range of 20° to 30° C. This cold water is then returned to the column 90, being the source of the supply for the distributors 96 and 98. Valves 109 and 110 are operable to control the relative rates of supply of cold water to the respective distributors 96 and 98.

Referring now to FIG. 6 of the drawings, there is shown a modified water separation apparatus of the kind shown in FIG. 5. In the apparatus shown in FIG. 6, there is a lower body of packing 112 located intermediate the gas inlet 94 and the bottom of the column 90. Accordingly water comprising that leaving the packing 92 and that introduced through the distributor 96 descends under gravity through the packing 112. Steam is introduced into the column 90 below the packing 112 through an inlet 114. The steam thus ascends the packing 112 and is thereby effective to strip residual traces of sulphur dioxide from the water descending the packing 112. This water leaves the packing 112 at a temperature typically in the range of 100° to 110° C. (depending on the operating pressure of the column 90) and is withdrawn through the outlet 104 by the pump 106. A flow control valve 116 is provided in the inlet 114 to enable the rate of introduction of steam into the column 90 to be controlled.

In other respects, the operation and construction of the apparatus shown in FIG. 6 are identical to those of the apparatus shown in FIG. 5.

The method according to the invention is further illustrated by the following computer-simulated Examples.

EXAMPLE 1

A mixture of amine and sour water stripper gases from an oil refinery is treated by the method according to the invention in the plant shown in FIG. 1 of the drawings. The mixture is preheated to 500° C. in the heat exchanger 2, and the recycle stream is heated to 50° C. in the heater 22. The pressure of the feed gas stream is 55 kPa (gauge) and the outlet temperature of the furnace 6 is calculated to be 1298° C. The results of the simulation are given in Table 1 below. It is assumed that an apparatus as shown in FIG. 4 is used as the incinerator 16 and an apparatus as shown in FIG. 6 is used as the separator 20. It is further assumed that the water condensed in the separator 20 is free of sulphur dioxide.

TABLE 1

| | Material flows (kmols/hr) of Streams | | | | | | | | | | |
|---|---|---|---|---|---|---|---|---|---|---|---|
| | A | B | C | D | E | F | G | H | I | J | K |
| $H_2$ | | | | 12.1 | 12.1 | | 7.1 | 5.0 | | | |
| $N_2$ | | | 8.0 | 13.6 | 13.6 | | 8.0 | 5.6 | 8.0 | | |
| CO | | | | 2.8 | 2.8 | | 1.6 | 1.2 | | | |
| $CO_2$ | 3.3 | | 5.2 | 6.0 | 6.0 | | 3.5 | 2.5 | 5.2 | | |
| $H_2S$ | 72.0 | | | 16.8 | 16.8 | | 9.8 | 7.0 | | | |
| COS | | | | 0.1 | 0.1 | | 0.1 | 0.0 | | | |
| $SO_2$ | | | 14.8 | 8.4 | 8.4 | | 4.9 | 3.5 | 14.8 | | |
| $H_2O$ | 13.1 | | 1.2 | 75.0 | 75.0 | | 43.9 | 31.1 | 60.8 | 59.6 | |
| $S_2$ | | | | 30.8 | | 30.8 | | | | | |
| HC (as Cl) | 0.4 | | | | | | | | | | |
| $NH_3$ | 11.2 | | | | | | | | | | |
| $O_2$ | | 22.4 | 0.5 | | | | | | | | |
| Total | 100.0 | 22.4 | 29.7 | 165.6 | 134.8 | 30.8 | 78.9 | 55.9 | 88.8 | 59.6 | 19.7 |

Referring to Table 1:

Stream A is the feed gas entering the burner 4;

Stream B is the oxygen stream entering the burner 4;

Stream C is the recycle stream downstream of the fan 24;

Stream D is the gas stream at the inlet to the sulphur condenser 14.

Stream E is the gas stream at the outlet for gas from the sulphur condenser 14.

Stream F is the sulphur stream withdrawn from the sulphur condenser 14.

Stream G is the first subsidiary stream (i.e. that stream passing from the condenser 14 to the incinerator 16).

Stream H is the second subsidiary stream (i.e. that stream passing from the condenser 14 to the catalytic stages 26).

Stream I is the gas stream at the outlet of the incinerator 16.

Stream J is the net water flow condensed in the separator 20.

Stream K is the oxygen stream supplied to the incinerator 16.

A calculation was also made of the effective cumulative percentage conversions achieved in the thermal stage (i.e. the furnace 6) and the catalytic stages 26 (assumed to be three in number) achieved in this example, and a comparative calculation was made for a conventional air-based Claus plant. These calculations assume that thermodynamic equilibrium is achieved in the thermal and catalytic stages.

The results are shown in Table 2 below.

TABLE 2

| | Thermal Stage | 1st Catalytic Stage | 2nd Catalytic Stage | 3rd Catalytic Stage |
|---|---|---|---|---|
| Example 1 | 85.56 | 95.19 | 98.45 | 99.31 |
| Air-based Plant | 69.36 | 92.07 | 97.16 | 98.35 |

EXAMPLE 2

An amine feed gas from an oil refinery is treated by the method according to the invention in the plant shown in FIG. 1 of the drawings. The feed gas stream is preheated to 500° C. in the heat exchanger 2, and the recycle stream is heated to 50° C. in the heater 22. The pressure of the feed gas stream is 55 kPa (gauge) and the outlet temperature of the furnace 6 is calculated to be 1305° C. The results of the simulation are given in Table 3 below. It is assumed that an apparatus as shown in FIG. 4 is used as the incinerator 16 and an apparatus as shown in FIG. 6 is used as the separator 20. It is further assumed that the water condensed in the separator 20 is free of sulphur dioxide.

TABLE 3

| | Material Flows (kmols/hr) of Streams | | | | | | | | | | |
|---|---|---|---|---|---|---|---|---|---|---|---|
| | A | B | C | D | E | F | G | H | I | J | K |
| $H_2$ | | | | 11.1 | 11.1 | | 5.3 | 5.8 | | | |
| $N_2$ | | | | | | | | | | | |
| CO | | | | 6.3 | 6.3 | | 3.0 | 3.3 | | | |
| $CO_2$ | 9.0 | | 9.3 | 12.7 | 12.7 | | 6.1 | 6.6 | 9.3 | | |
| $H_2S$ | 90.0 | | | 16.9 | 16.9 | | 8.1 | 8.8 | | | |
| COS | | | | 0.3 | 0.3 | | 0.1 | 0.2 | | | |
| $SO_2$ | | | 12.4 | 8.6 | 8.6 | | 4.1 | 4.5 | 12.4 | | |
| $H_2O$ | | | 0.9 | 64.9 | 64.9 | | 31.1 | 33.8 | 44.5 | 43.6 | |
| $S_2$ | | | | 38.3 | | 38.3 | | | | | |
| HC (as Cl) | 1.0 | | | | | | | | | | |
| $NH_3$ | | | | | | | | | | | |
| $O_2$ | | 25.9 | 0.5 | | | | | | | | 17.0 |
| Total | 100.0 | 25.9 | 23.1 | 159.1 | 120.8 | 38.3 | 57.8 | 63.0 | 66.2 | 43.6 | 17.0 |

Referring to Table 3, the streams A to K have the same definitions as the respective streams A to K of Table 1.

A calculation was also made of the effective cumulative percentage conversions achieved in the thermal stages (i.e. the furnace 6) and the catalytic stages 26 (assumed to be three in number) achieved in this Example, and a comparative calculation was made for a conventional air-based Claus plant. These calculations assume that thermodynamic equilibrium is achieved in the thermal and catalytic stages.

The results are shown in Table 4 below.

TABLE 4

|  | Thermal Stage | 1st Catalytic Stage | 2nd Catalytic Stage | 3rd Catalytic Stage |
| --- | --- | --- | --- | --- |
| Example 2 | 85.11 | 95.06 | 98.47 | 99.35 |
| Air-based Plant | 72.11 | 93.06 | 97.67 | 98.69 |

I claim:

1. A method of recovering sulphur from a feed gas comprising hydrogen sulphide, comprising the steps of:

a) carrying out combustion of a part of the hydrogen sulphide content of a feed gas stream in a furnace to form sulphur dioxide and water vapour;

b) supplying oxygen-rich gas to support the combustion of said part of the hydrogen sulphide at a rate such that the volumetric flow rate of oxygen into the furnace is less than half the volumetric flow rate of hydrogen sulphide into the furnace, the oxygen-rich gas supporting combustion of said part of the hydrogen sulphide;

c) allowing remaining hydrogen sulphide in the feed gas stream to react in the furnace with said sulphur dioxide thereby producing sulphur vapour and water vapour;

d) withdrawing a stream of gas -mixture comprising hydrogen sulphide, sulphur dioxide, sulphur vapour and water vapour from the furnace and separating sulphur vapour therefrom to form a partially converted gas stream;

e) dividing the partially converted gas stream into first and second subsidiary partially converted gas streams;

reacting with oxygen-rich gas at least part of the first subsidiary partially converted gas stream so that all of said hydrogen sulfide of said at least part of the first subsidiary partially converted gas stream is fully oxidized to sulphur dioxide and water vapour and thereby forms a hydrogen sulphide-free gas stream;

g) separating water vapour from the hydrogen sulphide-free gas stream to form a recycle gas stream;

h) returning to the furnace at least part of the recycle gas stream and reacting in the furnace sulphur dioxide in the said part of the recycle stream with hydrogen sulphide in the feed gas so as to enhance the sulphur formation in the furnace;

i) subjecting the second subsidiary partially converted gas stream to at least one further stage of reaction between its hydrogen sulphide content so as to form further sulphur vapour;

j) extracting said further sulphur vapour from the second subsidiary partially converted gas stream; and k) discharging the second subsidiary partially converted gas downstream of the said at least one further stage of reaction.

2. The method as claimed in claim 1, wherein said at least one further stage of reaction between hydrogen sulphide and sulphur dioxide is at least one catalytic stage.

3. The method as claimed in claim 2, wherein the mole ratio of hydrogen sulphide to sulphur dioxide in the second subsidiary partially converted gas stream is about 2:1.

4. The method as claimed in claim 1, wherein there are a plurality of at least one further stages of reaction between hydrogen sulphide and sulphur dioxide, said plurality of at least one further stages comprising an upstream furnace stage to which a further feed stream comprising hydrogen sulfide and a further oxygen-rich gas are supplied in addition to said second subsidiary partially converted gas stream and at least one downstream catalytic stage.

5. The method as claimed in claim 1, in which the feed gas stream is pre-heated to a temperature of at least 300° C. upstream of step (a).

6. The method as claimed in claim 1, in which the mole ratio of hydrogen sulphide to oxygen entering the furnace is in the range of 5:2 to 4:1.

7. The method as claimed in claim 1, in which the second subsidiary partially converted gas is discharged from downstream of the said further stage of reaction to the ambient atmosphere, to a tail gas clean up unit or to an incinerator.

8. A method of recovering sulphur from a feed gas comprising hydrogen sulphide, comprising the steps of:

a) carrying out combustion of a part of the hydrogen sulphide content of a first feed gas stream in a first furnace to form sulphur dioxide and water vapour;

b) supplying oxygen-rich gas to support the combustion of said part of the hydrogen sulphide at a rate such that the volumetric flow rate of oxygen into the first furnace is less than half the volumetric flow rate of hydrogen sulphide into the furnace, the oxygen-rich gas supporting combustion of said part of the hydrogen sulphide;

c) allowing remaining hydrogen sulphide in the first feed gas stream to react in the first furnace with said sulphur dioxide thereby producing sulphur vapour and water vapour;

d) withdrawing a stream of gas mixture comprising hydrogen sulphide, sulphur dioxide, sulphur vapour and water vapour from the first furnace and separating sulphur vapour therefrom to form a partially converted gas stream;

e) reacting with oxygen-rich gas at least part of the partially converted gas stream so that all the hydrogen sulphide in said part of the partially converted gas stream is fully oxidized to sulphur dioxide and water vapour and thereby forms a hydrogen sulphide-free gas stream;

f) separating water vapour from the hydrogen sulphide-free gas stream produced by step (e) to form a sulphur dioxide containing gas stream depleted in water vapour;

g) dividing said gas stream depleted in said water vapor into first and second subsidiary streams;

h) returning to the furnace the first subsidiary gas stream and reacting in the first furnace sulphur dioxide in the first subsidiary gas stream with hydrogen sulphide in the feed gas so as to enhance the sulphur formation in the first furnace;

i) subjecting the second subsidiary gas stream to reaction with hydrogen sulphide in a further furnace to form further sulphur vapour;

j) supplying a further feed stream of hydrogen sulphide and further oxygen-rich gas to the further furnace and burning hydrogen sulphide therein to forming sulphur vapour and water vapour;

k) withdrawing a further treated gas stream comprising hydrogen sulphide, water vapour, sulphur dioxide and sulphur vapour from the further furnace;

l) extracting sulphur vapour from the further treated gas stream to form a sulphur-free gas stream;

m) subjecting the sulphur-free gas stream to at least one catalytic stage of reaction between hydrogen sulphide and sulphur dioxide, to form yet further sulphur vapour; and n) extracting the yet further sulphur vapour to form a residual gas; and o) discharging the residual gas.

9. The method as claimed in claim 8, in which the first feed gas stream is preheated to a temperature of at least 300° C.

10. The method as claimed in claim 8, in which the further feed gas stream is preheated to a temperature of at least 300° C.

11. The method as claimed in claim 8, in which the mole ratio of hydrogen sulphide to oxygen entering the first furnace is in the range of 5:2 to 4:1.

12. The method as claimed in claim 8, in which the residual gas is discharged to the ambient atmosphere, to a tail gas clean up unit or to an incinerator.

* * * * *